C. D. MILLER.
ELECTRICAL MEASURING INSTRUMENT.
APPLICATION FILED APR. 5, 1919.
1,397,441.
Patented Nov. 15, 1921.
2 SHEETS—SHEET 2.
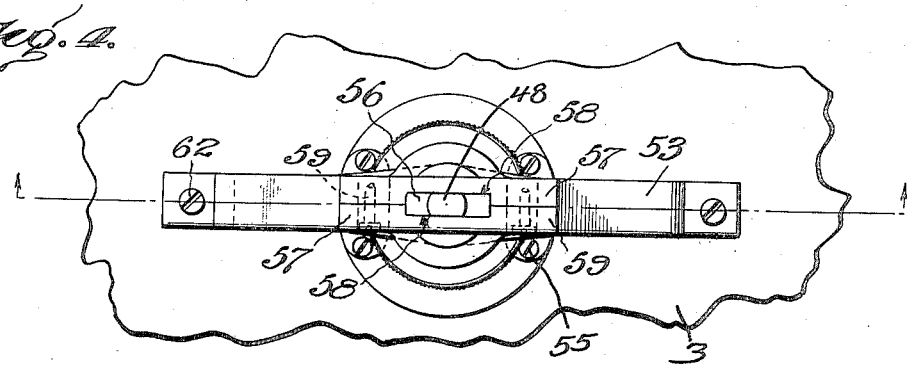
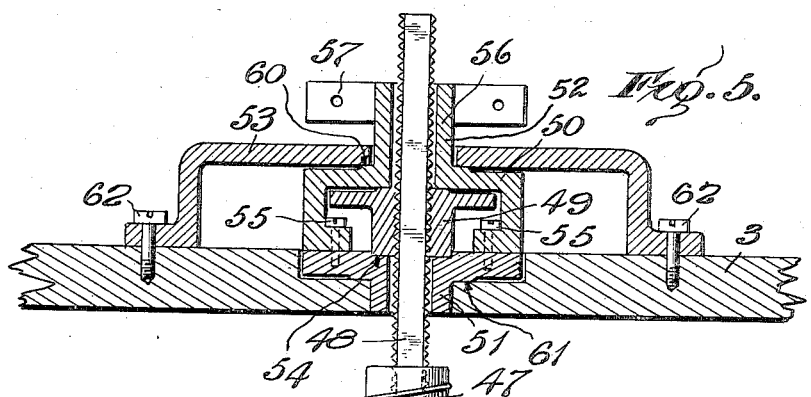
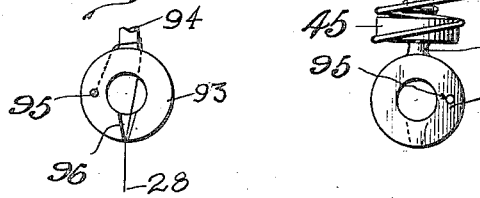
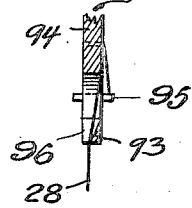
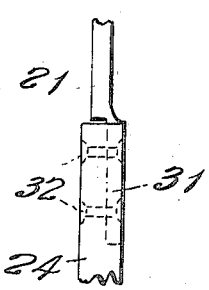
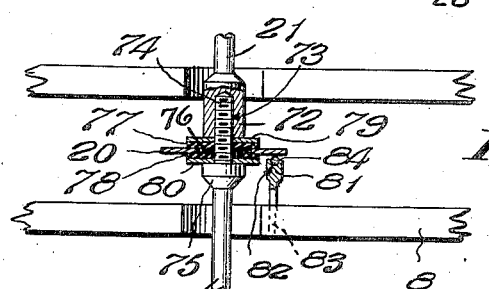
Inventor
Carl D. Miller
By Shepard & Shepard
his Attorneys.

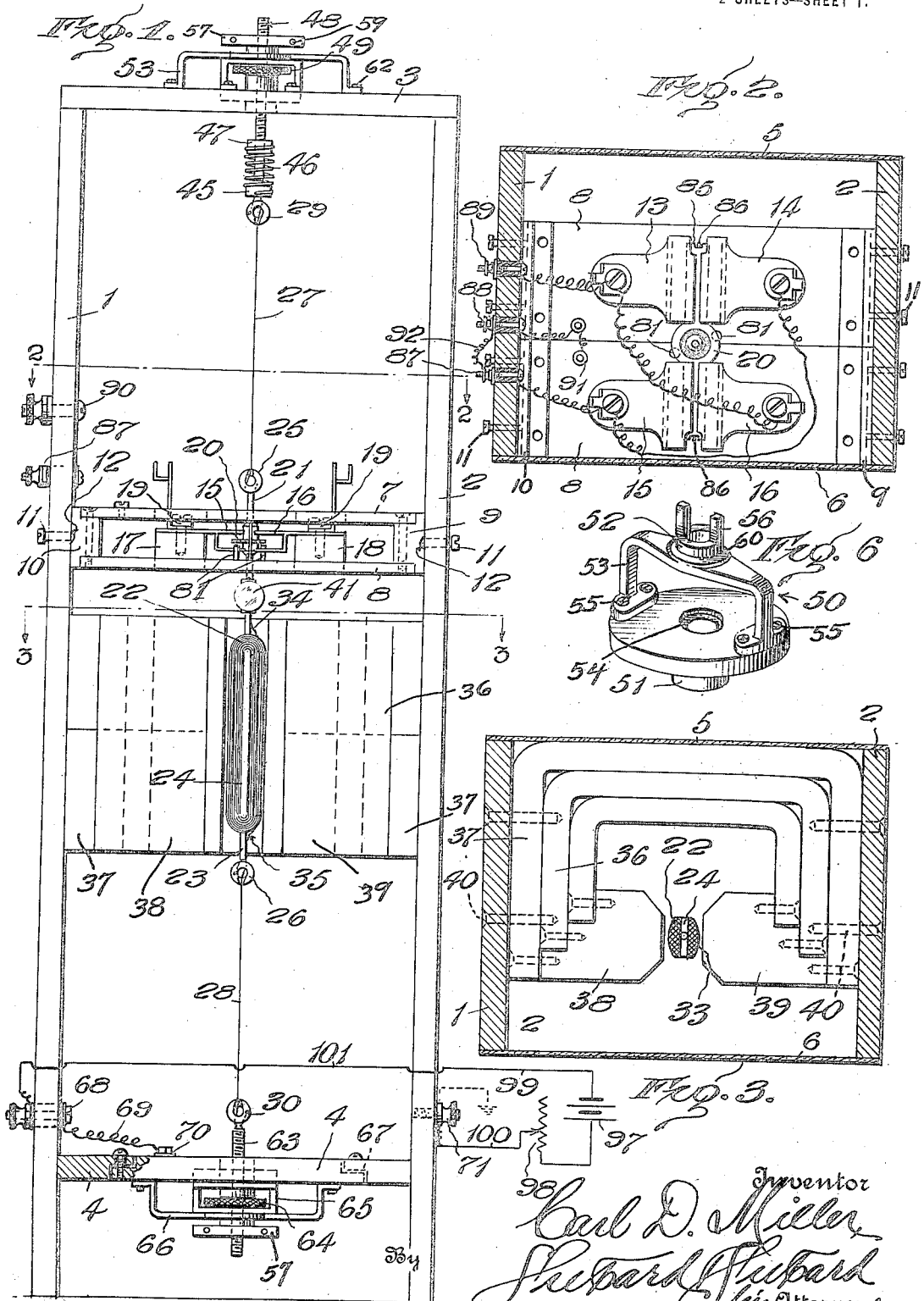

UNITED STATES PATENT OFFICE.

CARL DANFORTH MILLER, OF ROCKVILLE, MASSACHUSETTS.

ELECTRICAL MEASURING INSTRUMENT.

1,397,441.  Specification of Letters Patent.  Patented Nov. 15, 1921.

Application filed April 5, 1919. Serial No. 237,726.

*To all whom it may concern:*

Be it known that I, CARL DANFORTH MILLER, a citizen of the United States, residing at Rockville, in the county of Norfolk and State of Massachusetts, have invented new and useful Improvements in Electrical Measuring Instruments, of which the following is a specification.

This invention relates to electrical measuring instruments and more particularly to a voltage measuring instrument of the electrometer or static volt meter type.

The general object of the invention is to provide an instrument of the above type in which it is possible to eliminate substantially all mechanical and electrical error. I attain this object of my invention by the combination of a quadrant electrometer of the zero type with means for accurately adjusting the force tending to hold the needle of the electrometer at zero against the static force exerted thereon by the voltage impressed on the elements of the electrometer. Essentially the instrument consists of a quadrant electrometer member and a galvanometer (or other electro-motive) member, which are so mechanically coupled and electrically connected that the two members will exert torques tending when balanced to hold the needle in its zero position, together with means for accurately varying and measuring the amount of electrical current supplied to the electro-motive member.

Various other objects of my invention will be apparent from a perusal of the following specification and the drawings accompanying the same.

My invention is illustrated in the accompanying drawings, in which:—

Figure 1 is a front elevation of the instrument with the transparent front plate removed.

Fig. 2 is a section on the line 2—2 of Fig. 1, with certain portions removed for the sake of clearness.

Fig. 3 is a section on the line 3—3 of Fig. 1.

Fig. 4 is a top plan view of the upper tension adjusting member.

Fig. 5 is a section on the line 5—5 of Fig. 4.

Fig. 6 is a perspective view of the movable seat for the adjusting nut.

Fig. 7 is a detail view of the suspension wire anchorage member.

Fig. 8 is a vertical section through the axis of the wire anchorage member.

Fig. 9 is an enlarged fragmentary sectional view of the needle mounting.

Fig. 10 is a large scale fragmentary view of the coil support.

Referring to the drawings in detail, 1 and 2 are the side members forming the sides of the instrument casing, above which is mounted the top member 3 and near the bottom of which is mounted the bottom member 4 extending between the side members and spaced from the bottom. A back closure member 5 extends the length of the back of the instrument between the side members 1 and 2, the front of the instrument being closed with a transparent plate or cover 6 preferably of glass. Near the center of the instrument and between the sides 1 and 2 are mounted the electrometer mounting plates 7 and 8 which are held in position and spaced apart by the blocks 9 and 10 of insulating material held between the side members 1 and 2 by means of set screws 11 which set into grooves 12 in the insulating members 9 and 10. The grooves 12 extend continuously through the length of the insulating blocks 9 and 10 so that when the set screws 11 are slightly loosened, the mounting plates and the blocks may be slid out of place as a whole. The mounting plates 7 and 8 are each made in two pieces, as is indicated for the plate 8 in Fig. 2. Between the plates 7 and 8 are mounted four electrometer quadrants 13, 14, 15 and 16. The quadrants are held in position by means of suitable insulating posts such as 17 and 18 secured in the lower mounting plate 8 and to which the quadrants are secured by means of the screws 19. The quadrants 13 to 16 are made C-shaped in cross section, as shown in Fig. 1 and spaced apart as shown in Figs. 1 and 2.

Mounted within the quadrants is an electrometer needle 20 carried on a spindle 21 which passes through openings in the top and bottom mounting plates 7 and 8, and connecting below the mounting plate 8 with the galvanometer coil 22, the lower part of which is provided with a short spindle 23 which lines up with the spindle 21 to form a continuation thereof, the spindles 21 and 23 being rigidly connected through the core member 24 of the galvanometer coil, thus the spindles 21 and 23 and the core 24 form a rigid member. At the ends of the spindles 21 and 23 are carried the wire anchorage members 25 and 26, respectively, to which the upper and lower suspension wires 27 and 28 are connected, which suspension wires are held at top and bottom by the anchorage members 29 and 30.

The spindle 21 may be connected to the core 24 in any suitable manner, preferably as indicated in Fig. 10, in which the end 31 is shown flattened and countersunk in the core 24 and held in place by means of suitable bolts or rivets 32, the flattened portion 31 being suitably offset from the spindle 21 so as to bring the center of the core 24 in alinement with the axis of the spindle 21. The galvanometer coil 22 formed on the core 24 has its opposite terminals 34 and 35 electrically connected with the spindles 21 and 23, respectively, the spindles being insulated from each other by the core member 24 which is made of insulating material such as indurated fiber. A permanent magnet 36 is provided for the galvanometer coil and consists of a nest of U-shaped permanent magnet members 37 provided with long pole pieces 38 and 39, and mounted as a whole in the casing by means of suitable screws or bolts 40. A mirror 41 is rigidly mounted on the spindle 21 between the galvanometer coil and electrometer needle.

The wire holders or anchorage members 29 and 30 are adjustably held in the top and bottom members 3 and 4, respectively, of the instrument frame in a manner to be adjusted vertically and angularly. The wire holder 29 carries a head 45 connected through a retractile spring 46 with the collar 47 threaded on the flattened adjusting bolt 48, the connection between the spring and the head and collar being effected by means of spiral threads or grooves in the collar into which the end convolutions of the spring are fitted. The adjusting bolt 48 extends up through the top member 3 above which it is provided with an adjusting nut 49 rotatably mounted within the cage 50 which in turn is mounted to rotate on hollow guide bearings 51 and 52 journaled in the top member 3 and the bridge member 53. The adjusting bolt 48 passes loosely through the openings in the hollow guide bearings 51 and 52 so that it is held against vertical movement by the adjusting nut 49 only. Adjusting nut 49 is held in position in the cage member 50 by being nested in the recess 54 formed in the bottom portion of the cage member. In order to hold the adjusting nut in its various adjusted positions the cage member 50 is made in two parts as indicated, the upper and lower parts being held together by means of suitable screws or bolts 55 and the several parts so proportioned in relation to each other that when the bolts 55 are screwed down tight the adjusting nut will be snugly bound between the upper and lower parts of the cage member.

The cage member 50 is formed as shown in perspective in Fig. 6 from which it will be seen that the upper hollow bearing 52 is flattened at opposite sides near its upper end where it projects through the bridge member 53 forming a pair of flat sided extensions 56 between which the flattened bolt 48 projects. A split adjusting yoke 57 having rectangular recesses 58 is arranged to fit over the upright members 56 and to be clamped thereon by means of the clamping bolts 59. The purpose of this yoke member 57 is to afford rotary adjustment of the cage 50 the upper and lower portions of which are provided with reduced bearing surfaces in the form of annular shoulders 60 and 61 which bear against the bridge member 53 and the top member 3 of the instrument frame. The friction of this bearing may be adjusted by adjusting the bolts 62. It is important that the flattened bolt 48 be maintained in fixed angular relation with the cage member 50 and to this end the width of the extensions 56 is made substantially equal to or slightly less than that of the flattened bolt so that when the yoke 57 is clamped thereon the central portion of the flat sides of the recesses 58 in the yoke will bear against the sides of the flattened bolt. Thus while the bolt 48 may be fed up and down through the cage member by turning the adjusting nut 49 it will not turn in relation to the cage member but may be turned in relation to the other parts of the instrument by moving the cage adjusting yoke 57.

The means for adjusting the lower wire holder 30 is similar in all respects to the just described upper wire holder 29 except that the use of a tension spring such as 46 of the upper mechanism is omitted, the holder 30 being carried by the flattened bolt 63 which passes directly to the lower adjusting nut 64 journaled in the rotatably adjustable cage 65 which in turn is journaled between the bottom member 4 and the bridge member 66. To prevent electrical connection between the suspension wire 28 and the frame of the instrument, the portion of the bottom member 4 on which the lower adjusting mechanism is mounted is insulated from the instrument frame by a suitable insulating washer 67 interposed between it and the inner edges of the bottom member 4, the inner and outer portions of the bottom member being held together by suitable insulated bolts. This insulation of the lower adjusting means enables electrical connection to be made with the lower terminal 35 of the galvanometer coil independently of the instrument frame, the said coil terminal being connected with the central portion of the bottom member 4 through the lower spindle member 23, the wire 28, wire holders 26 and 30, through the adjusting mechanism. For convenience in making connection with the insulated central portion of the bottom member 4 from the outside of the frame I provide the binding post 68 which passes through the frame and is insulated therefrom. Connection between this binding post 68 and the insulated portion of the bottom member 4 is effected through suitable conducting wire 69 extending from the inner end of the binding post 68 to the bottom member 4 to which it may be electrically connected in any suitable manner as by the binding post 70. The upper terminal 34 of the galvanometer coil is grounded to the frame through the upper spindle 21 to which it is connected and the suspension wire 27 and the upper adjusting means. This electrical connection may be made with the upper terminal of the coil through the instrument frame as by means of a binding post in electrical contact with the frame such as the post 71.

As it is desirable in making certain measurements to have the electrometer needle 20 insulated from the remainder of the apparatus I make the spindle 21 separable at the portion where it carries the needle as indicated in section in Fig. 9. This separable portion is made in the form of a head 72 having a bore 73 threaded to take the threaded plug 74 extending up from the annular shoulder 75 formed on the lower end of the separable portion. A series of washers are provided to fit around the threaded plug 74 between the shoulder 75 and the head 72. This set of washers constitutes a central washer 76 which fits around the plug 74 between it and the needle 20 and upper and lower washer 77 and 78 interposed between the top and bottom of the needle and clamping washers 79 and 80. It will be seen from the showing in Fig. 9 that by screwing the plug 74 into the head member 72 the separable members may be brought together and the needle clamped tightly in place in fixed relation to the spindle 21 between the clamping washers 79 and 80 and at the same time will be effectively insulated from all other metallic parts of the instrument. For establishing electrical connection between the electrometer needle 20 and the frame of the machine, when the needle is thus insulated from the spindle, I provide a pair of low friction brushes 81 arranged to contact with the needle 20 at diametrically opposite sides of the spindle and as near the pivotal point of the needle as possible. One of these brushes 81 is mounted on each of the inner and outer portions of the lower mounting plate 8. As the outer or forward portion of the plate 8 is removed from Fig. 9, only one of the brushes 81 is shown therein, but as these brushes are identical a detailed description of one will suffice. It will be seen from Fig. 9 that the brush 81 consists of a cup 82 carried at the top of a post 83 threaded into the plate 8 to permit vertical adjustment of the cup to and away from the needle 20. Contact between the needle and the cup is effected by a drop of mercury 84 which projects above the brim of the cup into contact with the needle. The brush member 81 is of course made of metal or other suitable electrical conducting material.

To limit the throw of the electrometer needle 20, it is provided at its ends with recesses 85 through which project stop pins 86 mounted on the lower plate 8.

The needle suspension filaments or wires 27 and 28 serve as lead wires for the galvanometer coil, and for the electrometer needle when it is electrically connected with the spindle, and for this reason the wire holders of which there are four, 25, 26, 29 and 30, must act both as good mechanical and good electrical connections. A very desirable form of anchorage or holder for the suspension wire is that here shown which is believed to be novel. This consists, as shown in Figs. 7 and 8, of the ring shaped head 93 on a shank 94 which in the holder 26 forms the end of the lower galvanometer spindle to which the wire is to be connected. A peg 95 is driven into the ring and to this the suspension wire 28 is soldered and passed around the shank 94 back to the side from whence it was started then through the opening in the ring and down through a notch 96 which notch is so positioned that the wire will join the bottom of the ring shaped head 93 at a point in the axis of the shank 94. By soldering the wire to the peg 95 which is driven into the head of the holder, a good electrical contact is effected and this connection together with the manner of passing the wire through the notch affords a sturdy and precisely arranged mechanical connection between the wires and holder.

To obtain true alinement throughout the suspension system and the member between the coil and needle, the spindle members 21 and 23 are flattened and slightly offset, and the flattened offset portion countersunk in the core of the coil as shown in the enlarged detail Fig. 10 the offset being so proportioned as to bring the parts into alinement.

Electrical connection with the different parts of the electrometer member from the outside of the casing is effected by means of the binding posts 87, 88, 89 and 90 mounted in the side 1 of the frame, all of which except the latter being insulated from the frame in any suitable manner as that indicated in Figs. 1 and 2, the latter post 90 being electrically connected with the side 1 of the metal frame. These binding posts may be connected to the different elements of the electrometer in various ways according to the particular measurements or tests to be made. The connections shown are those for measuring the voltage between any two points as across the line leads of a supply system or between one side of line and ground, using the mercury-drop brushes for effecting connection with the electrometer needle, the needle being otherwise insulated from all other parts of the instrument. On the connection shown, the binding post 87 is connected to the quadrants 15 and 14 (Fig. 2); the post 89 to the quadrants 13 and 16, and the post 88 to the front and rear members of the lower mounting plate 8 by means of the binding posts 91 from which electrical connection is extended to the needle 20 by way of the plate 8 and mercury drops 84. The bridging of the posts 87 and 88 by the conductor 92 on the outside of the instrument frame, brings the needle and quadrants 15 and 14 into electrical connection with each other. Thus if the binding posts 87 and 89 are connected to any two points whose potential difference is to be measured, the potential of one point will be impressed upon the needle and quadrants 15 and 14 while that of the other point will be impressed upon the quadrants 13 and 16.

When it is desired to eliminate whatever drag or friction is produced by the mercury drops, the posts 81 are screwed down to move the mercury drops out of contact with the electrometer needle and the needle electrically connected with the spindle by removing the insulating washers 77 and 78 and screwing the heads 72 and 75 together to bring the metal washers 79 and 80 into clamping engagement with the needle. The suspension wire 27 will then serve as a common lead wire connecting both the needle and the upper terminal of the galvanometer coil to the frame of the instrument through the upper adjusting means, the frame of the instrument then serving as a local ground or common connecting means to which connection may be made with outside points or other elements of the instrument through the grounded binding posts 90 and 71. For example, when the needle is connected to the frame as above described, it and one set of diametrically opposite quadrants may be connected together by connecting the binding post 90 with 88 or 89.

The operating circuit for the galvanometer coil may be any suitable arrangement for supplying electrical current to the coil in any amount necessary to produce the required torque to balance the torque produced by the electrometer, and means whereby the amount of current being supplied may be accurately ascertained either directly or by computation. A convenient and preferred arrangement for controlling the galvanometer is that shown diagrammatically in Fig. 1. This consists of a source of electrical current having a known constant voltage such as a standard cell 97 connected in series with the galvanometer coil and a known variable resistance 98. The completed galvanometer circuit may be traced as follows: cell 97, wire 99, variable resistance 98, wire 100, frame of instrument, suspension wire 27, spindle member 21, galvanometer coil 22, lower spindle section 23, suspension wire 28, lower adjusting means to insulated portion of bottom member 4, conductor 69, insulated binding post 68, conductor 101 back to the source 97. By adjusting the resistance 98 the amount of electrical current supplied to the coil is varied and may be readily computed from the known voltage and the known total resistance of the circuit.

The method of using my apparatus and its operation, for example in measuring the voltage between two points, is as follows: assuming it is desired to measure the voltage across the line conductors of a high potential supply system having either alternating or direct current, and assuming the local circuit of the instrument to be as shown in the drawings, Figs. 1, 2 and 3, the binding posts 87 and 89 are connected to the two sides of the line, respectively, which causes the potential of one side of the line to be impressed on the needle 20 and the quadrants 15 and 14 while that of the other side of the line is impressed on the quadrants 13 and 16. The needle and quadrants are thus given a static charge which causes the needle to be deflected from the normal or zero position shown, the needle rotating on the axis of the spindle 21 to the small limit allowed by the stop pins 86 carrying the galvanometer coil 22 around with it. The current supplied to the galvanometer coil is then adjusted by means of the adjustable resistance 98 to an amount sufficient to cause the galvanometer to produce the necessary counter torque on the spindle 21 to bring the needle 20 back to the zero position. When this balance obtains, the relation between electrometer voltage and galvanometer current is: $V^2 = kI$, in which $k$ is a constant for the instrument and is independent of the values of V and I. By knowing values of V and I which produce a balance, $k$ can be computed from the equation $k = \frac{V^2}{I}$. Letting $\sqrt{k} = k'$, the equation may be written $V = k'\sqrt{I}$. The value of I (the current in the galvanometer circuit) being computed as previously described.

Where the E. M. F. of the galvanometer circuit is constant, as in the present case where a standard cell is used, the value of V (the high voltage being measured) may be directly computed from the resistance of the galvanometer circuit, when a balance obtains by the equation— $V = \dfrac{k_2}{\sqrt{R}}$ where R=the resistance of the galvanometer circuit and $k_2 = k_1\sqrt{EMF}$.

The above relationships are rigorous for all values of voltage and current for which it is physically possible for the instrument to be operated, that is, so long as such difficulties as discharge between the quadrants and the electrometer needle due to excessive voltage, or over-heating of the galvanometer coils due to excessive current, are avoided. The instrument may therefore be conveniently used over a wide range of voltages, with an accuracy depending largely upon the suspension or bearings of the spindle on which the electrometer needle and the galvanometer coil are mounted.

If more convenient or better for some purposes, instead of having the galvanometer part of the instrument of the d'Arsonval type with moving coil, it may be of the moving magnet type, the current-carrying coils being stationary. Or it may be in the form of an electrodynamometer, no permanent magnet being used.

While I have herein shown and described a specific embodiment of my invention and have given a specific example of one of the uses, for the purpose of disclosure, it is to be understood that I do not limit myself to such specific disclosure but contemplate all such uses and modifications thereof as fall within the scope of the appended claims.

Generally the invention may be applied in the making of any tests where an electrometer or static voltmeter would be used. For example the invention may be applied to the measuring of dielectric power losses in a manner which will readily suggest itself to those skilled in the art.

What I claim is:

1. An electrical measuring instrument comprising an electrometer, and electro-magnetic torque producing means, the rotary elements of said electrometer and electro-magnetic torque producing means being mechanically connected.

2. An electrical measuring instrument comprising an electrometer, electro-magnetic torque producing means and a common spindle for the rotary members of said electrometer and said electro-magnetic means.

3. An electrical measuring instrument comprising an electrometer, electro-magnetic torque producing means, a common spindle rigidly connecting the rotary members of said electrometer and electro-magnetic means, suspension filaments for said spindle, vertical and rotary adjusting means for said suspension filaments and tension means connecting one of said filaments with one of said adjusting means.

4. An electrical instrument comprising a frame or casing, an electrometer mounted in said frame, electro-magnetic torque producing means mounted in said frame below said electrometer with its rotary member vertically below and coaxial with the needle of the electrometer, a common spindle carrying said needle and rotary member rigidly fixed thereto, suspension filaments for said spindle connected between opposite ends of the spindle and the frame, means connecting said filaments with the frame for rotary and vertical adjustment therewith, said electrometer needle and rotary members being so angularly arranged on the spindle as to assume their zero positions at the same time, means for limiting the movement of said spindle, and circuit connections for said electrometer and said electro-magnetic means.

5. The method of measuring electrical potential difference which consists in causing balanced counter torques to be produced directly upon a common rotatable member by the electro-static effect of the potential to be measured and by electro-magnetic means, respectively, and measuring the amount of electrical current in producing the electro-magnetic torque.

6. The method of measuring electrical potential difference which consists in causing counter torques to be produced by the potential to be measured and by electro-magnetic torque producing means directly upon a common rigid member, regulating the amount of current supplied to the electro-magnetic torque producing means to obtain a balance of said counter torques, and measuring the amount of electrical current being consumed by the electro-magnetic means when a balance is obtained.

7. In an instrument for measuring electrical potential difference including an electrometer and an electro-magnetic torque producing means having their respective rotary elements mechanically connected, filament suspending means for the rotary elements in line with the axis thereof, and means for tensioning and maintaining the said filament suspending means under a yielding tension.

8. In an instrument for measuring electrical potential difference including an electrometer and an electro-magnetic torque producing means having their respective rotary elements mechanically connected, filament suspending means for the rotary elements in line with the axis thereof, and anchoring means for the filaments comprising a shank, a ring-shaped head having a flared opening diametrically opposite the shank, the filament passing through the flared opening and thence around the shank, and means securing the filament to the ring.

9. In an instrument for measuring electrical potential difference including an electrometer and an electro-magnetic torque producing means having their respective rotary elements mechanically connected, filament suspending means for the rotary elements in line with the axis thereof, means for tensioning the filaments, and means for angularly adjusting the filament tensioning means and securing the same in the adjusted position.

CARL DANFORTH MILLER.